US007960450B2

(12) United States Patent
Kawagoshi et al.

(10) Patent No.: US 7,960,450 B2
(45) Date of Patent: Jun. 14, 2011

(54) FLAME RETARDANT AND LIGHT DIFFUSING POLYCARBONATE RESIN COMPOSITION AND LIGHT DIFFUSING SHEET THEREOF

(75) Inventors: Akihito Kawagoshi, Osaka (JP); Koji Okada, Osaka (JP)

(73) Assignee: Styron Europe GmbH, Horgen (CH)

( * ) Notice: Subject to any disclaimer, the term of this patent is extended or adjusted under 35 U.S.C. 154(b) by 165 days.

(21) Appl. No.: 12/438,648

(22) PCT Filed: Nov. 17, 2006

(86) PCT No.: PCT/JP2006/322958
§ 371 (c)(1),
(2), (4) Date: Feb. 24, 2009

(87) PCT Pub. No.: WO2008/023445
PCT Pub. Date: Feb. 28, 2008

(65) Prior Publication Data
US 2009/0326120 A1    Dec. 31, 2009

(30) Foreign Application Priority Data

Aug. 25, 2006  (JP) ................................. 2006-228602
Sep. 21, 2006  (JP) ................................. 2006-255430

(51) Int. Cl.
C08K 7/00    (2006.01)
(52) U.S. Cl. ........................................ 523/220; 252/582
(58) Field of Classification Search .................. 523/220; 252/582
See application file for complete search history.

(56) References Cited

U.S. PATENT DOCUMENTS

| 3,956,235 | A | 5/1976 | Pasternack et al. |
| 4,837,280 | A | 6/1989 | Awaji et al. |
| 4,939,186 | A | 7/1990 | Nelson et al. |
| 5,236,633 | A | 8/1993 | Satake et al. |
| 5,352,747 | A | 10/1994 | Ohtsuka et al. |
| 5,354,514 | A | 10/1994 | Satake et al. |
| 5,514,740 | A | 5/1996 | Miyake et al. |
| 5,807,908 | A | 9/1998 | Hirose et al. |
| 6,291,585 | B1 | 9/2001 | Tomari et al. |
| 6,433,050 | B1 | 8/2002 | Shinomiya et al. |
| 6,518,357 | B1 | 2/2003 | Rajagopalan et al. |
| 7,449,506 | B2 | 11/2008 | Sato |
| 7,829,179 | B2 * | 11/2010 | Sohn et al. .................. 428/195.1 |
| 2007/0047077 | A1 | 3/2007 | Browning |
| 2009/0233100 | A1 | 9/2009 | Nukui et al. |
| 2009/0258170 | A1 | 10/2009 | Kawagoshi et al. |
| 2010/0144939 | A1 | 6/2010 | Okada et al. |
| 2010/0148136 | A1 | 6/2010 | Kawagoshi et al. |
| 2010/0151221 | A1 | 6/2010 | Horisawa et al. |

FOREIGN PATENT DOCUMENTS

| EP | 0188792 | A1 | 7/1986 |
| EP | 0216412 | A1 | 4/1987 |
| EP | 0351875 | A2 | 1/1990 |
| EP | 1188792 | A1 | 3/2002 |
| EP | 0728811 | B1 | 9/2003 |
| JP | 57-24186 | A | 2/1982 |
| JP | 60-184559 | A | 9/1985 |
| JP | 62-135556 | A | 6/1987 |
| JP | 01-172801 | A | 7/1989 |
| JP | 02-46855 | A | 2/1990 |
| JP | 02-129261 | A | 5/1990 |
| JP | 02-163156 | A | 6/1990 |
| JP | 03-33115 | A | 2/1991 |
| JP | 03-143950 | A | 6/1991 |
| JP | 05-163400 | A | 6/1993 |
| JP | 05-163405 | A | 6/1993 |
| JP | 05-163408 | A | 6/1993 |
| JP | 05-163426 | A | 6/1993 |
| JP | 05-257002 | A | 10/1993 |
| JP | 06-192556 | A | 7/1994 |
| JP | 06-299035 | A | 10/1994 |
| JP | 06-306265 | A | 11/1994 |
| JP | 07-234304 | A | 9/1995 |
| JP | 07-240187 | A | 9/1995 |
| JP | 08-073653 | A | 3/1996 |
| JP | 09-194711 | A | 7/1997 |
| JP | 09-281307 | A | 10/1997 |
| JP | 10-17705 | A | 1/1998 |
| JP | 11-5241 | A | 1/1999 |
| JP | 11-217494 | A | 8/1999 |
| JP | 11-323120 | A | 11/1999 |
| JP | 2000-156107 | A | 6/2000 |
| JP | 2000-169695 | A | 6/2000 |
| JP | 2001-200151 | A | 7/2001 |
| JP | 2001-226575 | A | 8/2001 |
| JP | 2001-316581 | A | 11/2001 |
| JP | 2002-332401 | A | 11/2002 |
| JP | 2003-154621 | A | 5/2003 |
| JP | 2003-176404 | A | 6/2003 |

(Continued)

OTHER PUBLICATIONS

Franco, F. et al., "Theoretical Study of Structural and Electronic Properties of Methyl Silsequioxanes," *J. Phys. Chem. B*, 2002, vol. 106, pp. 1709-1713.

*Primary Examiner* — Edward J Cain
(74) *Attorney, Agent, or Firm* — Brinks Hofer Gilson & Lione

(57) ABSTRACT

A flame retardant and light diffusing polycarbonate resin composition comprising 100 parts by weight of a polycarbonate resin (A), 0.1 to 6 parts by weight of a light diffusing agent (B) with an average particle diameter of 1 to 10 μm, 0.03 to 1 part by weight of a light storing agent (C) with an average particle diameter of 1 to 20 μm and 0.03 to 1.5 parts by weight of a silicone compound (D) wherein the silicone compound (D) has a branched main chain structure and contains organic functional groups and the presence of aromatic groups is essential as the organic functional groups but the presence of hydrocarbon groups other than aromatic groups is optional as the organic functional groups other than terminal groups. The light diffusing sheet obtained by molding a polycarbonate resin composition of this invention can be used ideally in all applications where excellent flame retardance and a high degree of optical performance are needed such as in parts materials covering a light source such as, for example, in light diffusing sheets for direct backlighting units and edge lighting units for liquid crystal televisions, globe boxes for lighting devices and switches for various devices.

20 Claims, 1 Drawing Sheet

FOREIGN PATENT DOCUMENTS

| | | |
|---|---|---|
| JP | 2004-510869 A | 4/2004 |
| JP | 2005-015659 A | 1/2005 |
| JP | 2005-082647 A | 3/2005 |
| JP | 2006-063121 A | 3/2006 |
| JP | 2006-063122 A | 3/2006 |
| JP | 2006-078954 A | 3/2006 |
| JP | 2006-083309 A | 3/2006 |
| JP | 2006-089596 A | 4/2006 |
| JP | 2006-089599 A | 4/2006 |
| JP | 2006-124517 A | 5/2006 |
| JP | 2005-263911 A | 9/2006 |
| JP | 2006-316149 A | 11/2006 |
| JP | 2007-002075 A | 1/2007 |
| JP | 2007-138010 A | 6/2007 |
| WO | WO 02-028970 A1 | 11/2002 |
| WO | WO 2007-020211 A1 | 2/2007 |

* cited by examiner

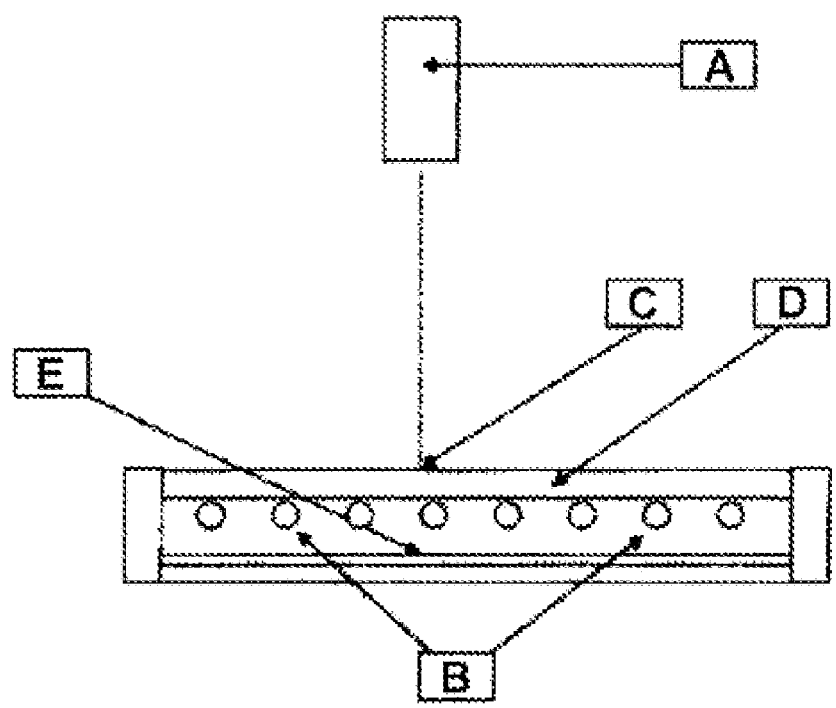
FIGURE

FLAME RETARDANT AND LIGHT DIFFUSING POLYCARBONATE RESIN COMPOSITION AND LIGHT DIFFUSING SHEET THEREOF

FIELD OF THE INVENTION

This invention relates to a light diffusing polycarbonate resin composition to which flame retardance is imparted without adversely affecting the light diffusing properties and luminance and without adding chlorine or bromine by adding a silicone compound of a specific construction to a light diffusing polycarbonate resin to which a light diffusing agent, a light storing agent and, when desired, polycaprolactone and a light diffusing sheet thereof. More specifically, this invention presents a light diffusing polycarbonate resin composition with excellent flame retardance, ideally used in parts materials covering a light source, for example, in light diffusing sheets for direct backlighting units and edge lighting units for liquid crystal televisions, globe boxes for lighting devices, switches for various devices and applications requiring light diffusion properties and a light diffusion sheet molded from the same.

BACKGROUND OF THE INVENTION

Polycarbonate resins are transparent, transmit light and are used in a broad range of applications in electrical, electronic, OA, automotive and other areas.

When a polycarbonate resin is used in applications such as direct lighting and edge lighting type units for liquid crystal televisions, lighting device covers, switches in various devices and the like, the light source is visible when the resin transmits light. Therefore, a material having sufficient light diffusing properties such that it does not reveal the shape of the light source (a lamp) behind a molded resin product without adversely affecting the luminance of the light source as much as possible is being sought.

In the conventional technology, a method was used in which polymer or inorganic particles with a different index of refraction were added as a dispersed phase to a thermoplastic resin forming a continuous phase for the purpose of imparting light diffusing properties to the polycarbonate resin. In addition, methods to realize desired light diffusion properties by adjusting the refractive index difference between the dispersed phase and the continuous phase or the size of the particles in the dispersed phase have been proposed. (References 1 and 2)

Similarly a light storing agent that emits light for an extended period of time when the irradiation is completed after an optical excitation, for example, using ultraviolet rays, is used in night time display applications such as evacuation markers and display lights and the like. (References 3 and 4)

Furthermore, a diffusion sheet with an even higher degree of optical performance could be obtained by using a light diffusing agent and a light storing agent in a clear thermoplastic resin such as a polycarbonate resin. (Japanese Patent Application No. 2005-165178)

Reference 1: Japanese Patent Application Public Disclosure (Kokai) No. S60-184559
Reference 2: Japanese Patent Application Public Disclosure (Kokai) No. H03-143950
Reference 3: Japanese Patent Application Public Disclosure (Kokai) No. H07-240187
Reference 4: Japanese Patent Application Public Disclosure (Kokai) No. 2000-156107

Although polycarbonate resin is a highly flame retardant plastic material possessing self extinguishing properties, even better flame retardance is being sought in order to satisfy the need for safety in electrical, electronic and OA applications where light diffusing sheets are used.

A method in which a large amount of an oligomer or a polymer of the carbonate derivative of brominated bisphenol A has previously been used to improve the flame retardance of polycarbonate resins.

However, the addition of a large amount of halogenated compound containing bromine raised a concern about the generation of a gas containing the halogen. In addition, the use of a flame retarding agent that does not contain chlorine, bromine and the like is desired from an environmental perspective.

Problems to be Solved by the Invention

The objective of this invention is to present a light diffusing polycarbonate resin composition with excellent flame retardance without adversely affecting the luminance and light diffusing properties and without containing chlorine or bromine.

Means to Solve the Problems

The inventors conducted an extensive study to solve the problems described above. As a result, the inventors discovered that a polycarbonate resin that is capable of yielding a light diffusing sheet with a high degree of optical performance and also having excellent flame retardance could be obtained by adding a light diffusing agent, a light storing agent, a silicone compound with a specific structure and, when desired, polycaprolactone. This invention was completed based on the discovery.

That is, the first embodiment of this invention presents a flame retardant and light diffusing polycarbonate resin composition comprising 100 parts by weight of a polycarbonate resin (A), 0.1 to 6 parts by weight of a light diffusing agent (B) with an average particle diameter of 1 to 10 µm, 0.03 to 1 part by weight of a light storing agent (C) with an average particle diameter of 1 to 20 µm and 0.01 to 1.5 parts by weight of a silicone compound (D), wherein the main chain of the silicone compound (D) is branched and contains organic functional groups that comprise aromatic groups or aromatic groups and hydrocarbon groups (excluding aromatic groups) per one hundred parts by weight of a polycarbonate resin (A) and a molded light diffusing sheet thereof.

In addition, the second embodiment of this invention presents a flame retardant and light diffusing polycarbonate resin composition comprising 100 parts by weight of a polycarbonate resin (A), 0.1 to 6 parts by weight of a light diffusing agent (B) with an average particle diameter of 1 to 10 µm, 0.03 to 1 part by weight of a light storing agent (C) with an average particle diameter of 1 to 20 µm, 0.01 to 1.5 parts by weight of a silicone compound (D) and 0.1 to 1.2 parts by weight of polycaprolactone (E), wherein the main chain of the silicone compound (D) is branched and contains organic functional groups that comprise aromatic groups or aromatic groups and hydrocarbon groups (excluding aromatic groups) per one hundred parts by weight of a polycarbonate resin (A) and a molded light diffusing sheet thereof.

Advantages of the Invention

The light diffusion sheet obtained by molding the polycarbonate resin composition of this invention is ideally used in all applications where excellent flame retardance and a high degree of optical performance are needed such as, for example, in parts materials covering a light source, in light diffusing sheets for direct backlighting units and edge lighting units for liquid crystal television screens, globe boxes for lighting devices, switches for various devices.

BRIEF DESCRIPTION OF THE DRAWINGS

The FIGURE shows the method used in this invention for measuring the luminance between lamps. A: Luminance meter; B: Cold anode tubes; C: Luminance measuring position; D: Light diffusion sheet made of a polycarbonate resin; E: Light diffusion sheet

DETAILED DESCRIPTION OF THE INVENTION

The polycarbonate resin (A) used in this invention is a polymer obtained using a phosgene method wherein a dihydroxy diaryl compound is allowed to react with phosgene or using an ester exchange method wherein a dihydroxy diaryl compound and a carboxylic acid ester such as diphenyl carbonate and the like are allowed to react. Polycarbonate resins produced using 2,2-bis(4-hydroxyphenyl)propane (bisphenol A) may be cited as a typical example.

As the dihydroxy diaryl compound described above, bis(hydroxyaryl)alkanes such as bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenyl methane, 2,2-bis(4-hydroxyphenyl-3-methylphenyl)propane, 1,1-bis(4-hydroxy-3-tertiary-butylphenyl)propane, 2,2-bis(4-hydroxy-3-bromophenyl)propane, 2,2-bis(4-hydroxy-3,5-dibromophenyl)propane and 2,2-bis(4-hydroxy-3,5-dichlorophenyl)propane; bis(hydroxyaryl)cycloalkanes such as 1,1-bis(4-hydroxyphenyl)cyclopentane and 1,1-bis(4-hydroxyphenyl)cyclohexane; dihydroxy diaryl ethers such as 4,4'-dihydroxy diphenyl ether and 4,4'-dihydroxy-3,3'-dimethyldiphenyl ether; dihydroxy diaryl sulfides such as 4,4'-dihydroxy diphenyl sulfide; dihydroxy diaryl sulfoxides such as 4,4'-dihydroxy diphenyl sulfoxide and 4,4'-dihydroxy-3,3'-dimethyl diphenyl sulfoxide and dihydroxy diaryl sulfones such as 4,4'-dihydroxy diphenyl sulfone and 4,4'-dihydroxy-3,3'-dimethyl diphenyl sulfone and the like may be cited in addition to bisphenol A. They may be used individually or as a mixture of at least two types. In addition to these examples, piperazine, dipiperidyl hydroquinone, resorcinol, 4,4'-dihydroxydiphenyl and the like may be mixed and used.

Furthermore, the dihydroxy diaryl compounds described above and phenol compounds with at least three valences such as those shown below may be mixed and used. As the phenol with at least three valences, fluoroglucine, 4,6-dimethyl-2,4,6-tri-(4-hydroxyphenyl)-heptane, 2,4,6-dimethyl-2,4,6-tri-(4-hydroxyphenyl)-heptane, 1,3,5-tri-(4-hydroxyphenyl)-benzol, 1,1,1-tri-(4-hydroxyphenyl)-ethane and 2,2-bis-[4,4-(4,4'-dihydroxydiphenyl)-cyclohexyl]-propane and the like may be cited.

The viscosity average molecular weight of the polycarbonate resin is ordinarily 10,000 to 100,000, but 15,000 to 35,000 is preferred and 17,000 to 28,000 is more preferred. When producing such a polycarbonate resin, a molecular weight adjusting agent, a catalyst and the like may be used as needed.

The light diffusing agent (B) used in the present invention is not particularly restricted among polymeric systems and inorganic systems as far as the chemical composition is concerned. However, the agent needs to be present in the form of particles that are insoluble or slightly soluble in the matrix phase when the light diffusing agent (B) is added to the polycarbonate resin (A) component of the present invention and is dispersed using a well known method such as melting and mixing in an extruder.

As specific examples of the light diffusing agent, inorganic diffusion agents such as calcium carbonate, silica, silicones, zinc sulfide, zinc oxide, titanium oxide, titanium phosphate, magnesium titanate, magnesium titanate [sic], mica, glass filler, barium sulfate, clay, talc; rubber-like silicone elastomers; polymethyl silses oxanes and the like and organic diffusion agents such as acrylic, styrenic, polyester type, polyolefin type, urethane type, nylon type, styrene methacrylate type, fluorine type, norbornene type and the like agents may be cited.

The light diffusing agent (B) comprises particles with an average particle diameter of 1 to 10 μm. When the particle diameter is less than 1 μm, the agent simply transmits light and a light diffusing effect is sometimes difficult to obtain making this option unfavorable. Similarly, when the particle diameter exceeds 10 μm, a sufficient light diffusing effect is not obtained and visual recognition is sometimes poor making this option unfavorable. In addition, the particle size distribution is not particularly restricted, but may be about 0.1 to 100 μm or preferably 0.1 to 25 μm. At least two light diffusing agents with different average particle sizes, particle size distributions and types may be used in combination. Agents with a particle size distribution that is not uniform and have at least two particle size distributions may be used individually or in combination.

The amount of the added light diffusing agent (B) is 0.1 to 6 parts by weight per 100 parts by weight of the polycarbonate resin (A) of this invention. When the amount added is less than 0.1 parts by weight, a sufficient light diffusing effect becomes difficult to obtain making this option unfavorable. Similarly, the light transmittance is adversely affected when the amount exceeds 6 parts by weight, and sufficient light diffusing performance cannot be obtained, making this option unfavorable. The range 0.2 to 5 parts by weight is more preferred.

A much better surface light emission property (luminance) than that achieved using a conventional light diffusing agent (B) individually can be achieved by using a combination of a light diffusing agent (B) and a light storing agent (C) in a polycarbonate resin composition of this invention.

The light storing agent (C) used in this invention refers to an agent that emits light in the form of a discharge of stored light, such as ultraviolet rays and the like, for an extended period of time after irradiation by light is terminated. Upon completion of photo excitation, the agent can sustain residual light for about several minutes to several tens of hours and is distinguished from commonly used fluorescent brightening agents and the like that experience a rapid decay in light emission after light irradiation is terminated.

As the light storing agent (C), sulfide type light storing agents such as CaS:Bi, CaSrS:Bi, ZnCdS:Cu and the like; sulfide zinc type light storing agents such as ZnS:Cu and the like; aluminate type compounds represented by $MA_aI_bO_c$ wherein M comprises at least one metal element selected from calcium, strontium and barium, at least one element selected from europium, lanthanum, cerium, praseodymium, neodymium, samarium, gadolinium, terbium, dysprosium, fermium, erbium, thulium, ytterbium, ruthenium, manganese, tin and bismuth may be cited as an activation agent for the compound, and the compound and the like is present in no more than 10 mole %. Aluminate type compounds are preferred from the standpoint of hydrolysis properties and residual light properties. Strontium aluminate type compounds containing strontium as the metal element and europium or dysprosium as the activation agent are even more preferred.

The light storing agent (C) comprises particles with an average particle diameter of 1 to 20 μm or preferably of 2 to 17 μm. Particles smaller than 1 μm are difficult to manufacture, not practical and are difficult to obtain, making this option unfavorable. Similarly, particles larger than 20 μm make realizing a combination effect with a light diffusing agent (B) difficult, making this option unfavorable. In addition, the particle diameter distribution is not particularly restricted, but about 0.1 to 100 μm is used and from 0.5 to 80 μm is preferred. Furthermore, at least two or more light storing agents with different average particle diameters, particle diameter distributions and types may be used in combination. Agents with a particle size distribution that is not uniform and have at least two particle size distributions may be used individually or in combination.

The amount of the light storing agent (C) added is 0.03 to 1 part by weight per 100 parts by weight of the polycarbonate resin (A) of this invention. When the amount added is less than 0.03 part by weight, a combination effect with the light diffusing agent (B) is difficult to achieve, making this option unfavorable. Similarly, when the amount added exceeds 1 part by weight, the thermal stability is poor, making this option unfavorable. The use of 0.05 to 0.5 part by weight is more preferred, and the use of the light diffusing agent (C) in such a range enables a much better surface light emission (luminance) to be achieved.

The silicone compound (D) used in this invention, as shown in the general formula (1), contains a branched main chain and also aromatic groups or aromatic groups and hydrocarbon groups (excluding aromatic groups) as organic functional groups.
General Formula (1)

[Chemical Formula 1]

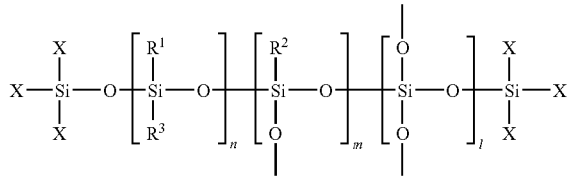

Here $R^1$, $R^2$ and $R^3$ represent organic functional groups bonded to the main chain, and X represents terminal groups.

That is, the presence of T units [$RSiO_{1.5}$ (in the formula, R represents an organic functional group)] and/or Q units ($SiO_{2.0}$) as branching units is a characteristic. The presence of at least 20 mole % of siloxane units in the whole is preferred. When less than 20 mole % is present, the heat resistance of the silicone compound (C) and its flame retarding effect decline. In addition, the viscosity of the silicone compound (C) itself is too low, and the kneading properties with the polycarbonate resin (A) and the molding properties are sometimes adversely affected. The presence of at least 30 mole % and no more than 95 mole % is more preferred.

In addition, the silicone compound (C) preferably contains at least 20 mole % of aromatic groups in the organic functional groups bonded to the main chain and branched side chains as the terminal groups or functional groups other than the terminal groups. When the concentration is below this range, the flame retarding effect sometimes declines due to the difficulty with which aromatic groups condense among themselves during combustion. At least 40 mole % but no more than 95 mole % is more preferred.

Aromatic groups must be present as the organic functional groups. As the aromatic groups, phenyl, biphenyl, naphthalene or their derivatives are preferred, but phenyl groups are more preferred from a safety standpoint.

Hydrocarbon groups other than aromatic groups may be optionally present as the organic functional groups other than terminal groups. As the hydrocarbon groups other than aromatic groups, alkyl groups, particularly methyl groups, are preferred.

The terminal groups are preferably one or a mixture of two to four selected from methyl, phenyl, hydroxyl and alkoxy groups. The silicone compound (C) can be uniformly dispersed in a polycarbonate resin (A) when these terminal groups are selected since gel formation (crosslinking) of the silicone compound (C) occurs with difficulty, due to low reactivity, when the polycarbonate resin (A) and the silicone compound (C) are kneaded. As a result, an even better flame retarding effect can be imparted and molding properties further improve. The methyl group is particularly preferred. When the methyl group, which has extremely low reactivity, is selected, the dispersion is extremely good and the flame retardance is further improved.

The average molecular weight (weight average) of the silicone compound (C) is preferably at least 5,000 but no more than 500,000 and more preferably at least 10,000 but no more than 270,000. When the average molecular weight is less than 5,000, the heat resistance of the silicone compound itself declines lowering the flame retarding effect. Furthermore, the melt viscosity is too low and causes the silicone compound to sometimes leach out on the surface of the molded polycarbonate resin (A) material, adversely affecting the molding properties. In addition, when the average molecular weight exceeds 500,000, the melt viscosity rises and sometimes adversely affects the dispersion uniformity in the polycarbonate resin (A) causing the flame retarding effect and molding properties to decline.

The amount of silicone compound (D) added is 0.01 to 1.5 parts by weight, preferably 0.01 to 0.8 part by weight and more preferably 0.05 to 0.5 part by weight per 100 parts by weight of the polycarbonate resin (A) of this invention. When the amount added is less than 0.01 part by weight, the flame retarding effect is inadequate making this option unfavorable. Similarly, when the added amount exceeds 1.0 part by weight, sufficient luminance cannot be achieved due to haze making this option unfavorable.

The polycaprolactone (E) used in this invention is a polymer manufactured using a ring opening polymerization of ε-caprolactone in the presence of a catalyst, and a homopolymer of 2-oxepanone is ideal for use. The polymer is readily available commercially, and Tone polymer manufactured by Dow Chemical, CAPA manufactured by Solvay and the like may be used. A viscosity average molecular weight of the polycaprolactone (D) of 10,000 to 100,000 is ideal, but 40,000 to 90,000 is even more preferred.

Furthermore, the polycaprolactone (E) also includes modified polycaprolactones obtained by having 1,4-butane diol and the like co-present when ε-caprolactone is subjected to a ring opening polymerization, modified polycaprolactones obtained by substituting molecular termini with ether or ester groups and the like.

The amount of polycaprolactone (E) added is 0.1 to 1.2 parts by weight or preferably 0.2 to 0.9 part by weight per 100 parts by weight of the polycarbonate resin (A) of this invention. When the amount added is less than 0.1 part by weight, the luminance improving effect is not observed. Similarly, when the amount added exceeds 1.2 parts by weight, sufficient thermal stability and flame retardance are not obtained making this option unfavorable.

Various well known additives, polymers and the like may be added as needed when performance other than light diffusing properties are demanded in practice from the light diffusing polycarbonate resin composition of this invention with excellent flame retardance. For example, a hindered amine type photo resistance stabilizing agent, a benzotriazole type, benzophenone type, triazine type or malonate type ultraviolet ray absorption agent or a combination thereof may be added in order to inhibit discoloration in molded resin products that are exposed to light for an extended period of time.

In addition, when flame retardance is needed various well known flame retarding agents such as, for example, bromine type flame retarding agents such as tetrabromobisphenol A oligomers and the like; monophosphate esters such as triphenyl phosphate, tricresyl phosphate and the like; oligomer type condensation phosphate esters such as bisphenol A diphosphate, resorcin diphosphate, teraxylenyl resorcin diphosphate and the like; phosphate type flame retarding agents such as ammonium polyphosphate, red phosphorus and the like; and various silicone type flame retarding agents may be cited, and, to improve the flame retardance even further, metal salts of aromatic sulfonic acid and metal salts of perfluoroalkane sulfonic acid may be cited. Ideally, organic acid metal salts such as the potassium salt of 4-methyl-N-(4-methylphenyl)sulfonyl-benzene sulfonamide, potassium diphenyl sulfone-3-sulfonate, potassium diphenylsulfone-3, 3'-disulfonate, sodium para-toluene sulfonate, the potassium salt of perfluorobutane sulfonate and the like may also be added. Of these flame retarding agents, phosphorus type flame retarding agents can ideally be used since they not only improve the flame retardance but also improve the fluidity.

In addition to the well known additives described above, phenol type or phosphorus type thermal stabilizing agents [2,6-di-t-butyl-4-methylphenol, 2-(1-methylcyclohexyl)-4,6-dimethylphenol, 4,4'-thiobis-(6-t-butyl-3-methylphenol), 2,2-methylene bis-(4-ethyl-6-t-methylphenol), n-octadecyl-3-(3,5-di-t-butyl-4-hydroxyphenyl)propionate, tris-(2,4-di-t-butylphenyl)phosphite, 4,4'-biphenylene diphosphinic acid tetrakis-(2,4-di-t-butylphenyl) and the like], lubricants [paraffin wax, n-butyl stearate, synthetic beeswax, natural beeswax, glycerin monoesters, montanic acid wax, polyethylene wax, pentaerythritol tetrastearate and the like], coloring agents [for example, titanium oxide, carbon black or a dye], fillers [calcium carbonate, clay, silica, glass fibers, glass spheres, glass flakes, carbon fibers, talc, mica, various whiskers and the like], fluidity improving agents, developing agents [epoxidized soy bean oil, fluid paraffin and the like] and, furthermore, other thermoplastic resins and various impact resistance improving agents (rubber reinforcing resins obtained using graft polymerization of a compound such as methacrylate esters, styrene, acrylonitrile and the like on a rubber such as polybutadiene, polyacrylate esters, ethylene-propylene type rubber and the like may be listed as examples) may be added as needed to the light diffusing polycarbonate resin composition of this invention with excellent flame retardance.

The execution mode and order are not restricted at all in this invention. For example, optional amounts of a polycarbonate resin (A), a light diffusing agent (B), a light storing agent (C), a silicone compound (D) and, when desired, polycaprolactone (E) as well as various additives may be metered in optional amounts and added at once to a tumbler, a ribbon blender, a high speed mixer and the like, and the mixture may be subsequently melted and kneaded using an ordinary monoaxial or diaxial extruder to form pellets in one method. Alternatively, in another method, individual components may be separately metered in portions or added as a whole to an extruder using multiple numbers of supply devices and may be melted and mixed. Furthermore, a master batch may be prepared by melting and blending (B) and/or (C) and/or (D) and/or (E) and/or various additives and the like in high concentrations and forming pellets. The polycarbonate resin (A) in the master batch may be subsequently blended in desired proportions. Conditions such as the locations at which components are added to the extruder, the extruder temperature, screw rotation rate, supply rates and the like may be optionally selected according to the circumstances, and the mixture may be formed into pellets.

Furthermore, the master batch and a polycarbonate resin (A) may be added in desired proportions and subsequently added directly to an injection molding device or a sheet extruding device to create a molded product.

EXAMPLES

This invention is further explained using examples below, but this invention is not limited to these examples. Now the terms "%" and "parts" in the examples refer to weight standards unless specifically stated otherwise.

Now, various components used are as follows.
Polycarbonate Resin

Sumitomo Dow K.K., Calibre 200-3 (viscosity average molecular weight: 28,000, henceforth abbreviated to "PC").
Light Diffusing Agent Nikko Rika K.K., MSP-S020 (average particle diameter 2 μm, polymethyl silsesquioxane diffusing agent, henceforth abbreviated to "LD-1").

Rohm and Haas Corp., EXL-5136 (average particle diameter 5 μm, acrylic diffusion agent, henceforth abbreviated to "LD-2")
Light Storing Agent Nemoto Tokushu Kagaku K.K., G-300FF (average particle diameter 5 μm (strontium aluminate type light storing agent, henceforth abbreviated to "PP-1")
Silicone Compound The silicone compound is produced according to a commonly practiced production method. That is, suitable amounts of diorganodichlorosilane, mono-organotrichlorosilane and tetrachlorosilane or their partially hydrolyzed condensates are dissolved in an organic solvent. Water is added to allow hydrolysis to occur, partially condensed silicone compound is formed, and triorganochlorosilane is further added to complete the polymerization. The solvent is subsequently separated using distillation and the like. The structural properties of a silicone compound synthesized using the method described above are as follows:

D/T/Q unit ratio in the main chain structure: 40/60/0 (molar ratio)

phenyl group ratio (*) in the total organic functional groups: 60 mole % terminal groups: methyl groups only weight average molecular weight (**): 15,000

* A phenyl group was first present in a T unit in a silicone containing T units and was present in D units for the remainder of the time. When a phenyl group was attached to a D unit, those with one group attached were preferred. When additional phenyl groups were present, two of them were attached. With the exception of the terminal groups, organic functional groups other than phenyl groups were all methyl groups.

** The significant figures for the weight average molecular weight were two digits. (Henceforth abbreviated to "Si flame retarding agent".)

Polycayrolactone

Solvay K.K., CAPA6800 (viscosity average molecular weight: 80,000, henceforth abbreviated to "PCL").

A polycarbonate resin, a light diffusing agent, a light storing agent, a silicone compound and polycaprolactone (PCL) were dry blended by hand in the proportions shown in Tables 2 to 4. The mixture was subsequently melted and kneaded using a diaxial extruder [Kobe Seikosho K.K., KTX-37 (axle diameter=37 mmΦ, L/D=30)] at 250° C. to 290° C. to obtain various pellets. The pellets obtained were subjected to the various evaluations described below.

The methods used to evaluate various properties in this invention are explained.

(Luminance Evaluation)

Two cold anode tubes were placed behind flat test sheets (90 mm×50 mm×2 mm thick) prepared using an injection molding device (manufactured by Nippon Seikosho K.K., J100E2P) at a cylinder set temperature of 300° C. and a metal form temperature of 80° C., and the luminance of the light emitting surface between the lamps was measured using a luminance meter (manufactured by Topcon K.K., BM-7). The luminance on a test piece surface in the direction perpendicular to the lamps was measured at a measuring distance of 35 cm and a visual field angle of 1°. Now, the luminance refers to the ratio of the luminosity in one direction to the luminosity per unit area in a surface perpendicular to the direction. In general, it represents the brightness of a light emitting surface [units: ($cd/m^2$)]. In addition, as the evaluation standard, those having a brightness between the lamps of at least 4,350 $cd/m^2$ passed (O) and those having less than 4,350 $cd/m^2$ failed (X). In addition, the measurement method is roughly diagramed in FIG. 1.

(Thermal Stability Evaluation)

Various pellets obtained were dried for at least 4 hours at 100° C., and flat test sheets (90×50×2 mm thick) were prepared using an injection molding device (manufactured by Nippon Seikosho K.K., J100E2P) at a cylinder set temperature of 300° C., a metal mold temperature of 80° C. and a residence time of 15 minutes. For the evaluation standards, the test sheets obtained were visually examined and those with little discoloration were rated passing (O) and those that discolored extensively were rated failing (X).

(Flame Retardance Evaluation)

The flame retardance was evaluated using the UL94V vertical combustion test method described below. Test pieces (125×13×3 mm thick) were prepared using various pellets obtained and an injection molding device (manufactured by Nippon Seiko K.K., J100E2P) at a cylinder temperature setting of 300° C. and a metal form temperature of 80° C. after drying the pellets for at least 4 hours at 100° C. The test pieces were left standing in a constant temperature chamber maintained at 23° C. and 50% humidity for 48 hours, and the flame retardance was evaluated according to the UL94 test (combustibility test for a plastic material for use in equipment parts) specified by Underwriters Laboratories. The UL94V test involved holding a burner flame for 10 seconds in contact with a test piece of a designated size held in a vertical position, and the flame retardance was evaluated based on the duration of time residual flame was observed and on the drip properties. The test piece was rated into the following categories. A test piece was rated unsuitable if it did not fit the categories below.

TABLE 1

|   | V-0 | V-1 | V-2 |
|---|---|---|---|
| Residual flame time for each sample | 10 sec or less | 30 sec or less | 30 sec or less |
| Total residual flame time for five samples | 50 sec or less | 250 sec or less | 250 sec or less |
| Cotton ignition caused by the drips | None | None | Observed |

The residual flame time shown in Table 1 referred to the duration of time during which a test piece continued to flame and burn after an ignition source was removed. Cotton ignition caused by the drips was decided by whether a cotton piece positioned about 300 mm under the lower edge of a test piece was ignited by the droppings (drips) from the test piece. In the evaluation standard, V-2 or better passed (O) and a piece that did not fit the categories in Table 1 was marked unsuitable (NR).

The evaluation results are shown in Tables 2-4.

TABLE 2

|   | Examples |  |  |  |  |
|---|---|---|---|---|---|
|   | 1 | 2 | 3 | 4 | 5 |
| PC (parts) | 100 | 100 | 100 | 100 | 100 |
| LD-1 (parts) | 0.5 | 0.5 | 0.5 | — | — |
| LD-2 (parts) | — | — | — | 0.3 | 4.0 |
| PP-1 (parts) | 0.2 | 0.2 | 0.2 | 0.2 | 0.2 |
| Si flame retarding agent (parts) | 0.3 | 0.005 | 0.5 | 0.3 | 0.3 |
|   | Evaluation results |  |  |  |  |
| Luminance between lamps ($cd/m^2$) | 4620 | 4650 | 4590 | 4600 | 4450 |
| Judgment | O | O | O | O | O |
| Thermal stability | O | O | O | O | O |
| Flame retardance | V-2 | V-2 | V-2 | V-2 | V-2 |
| Judgment | O | O | O | O | O |

TABLE 3

|   | Comparative Examples |  |  |  |  |
|---|---|---|---|---|---|
|   | 1 | 2 | 3 | 4 | 5 |
| PC (parts) | 100 | 100 | 100 | 100 | 100 |
| LD-1 (parts) | — | 0.05 | 0.5 | 0.5 | 0.5 |
| LD-2 (parts) | 8.0 | — | — | — | — |
| PP-1 (parts) | 0.2 | 0.2 | 1.5 | 0.2 | 0.2 |
| Si flame retarding agent (parts) | 0.3 | 0.3 | 0.3 | 0 | 3 |
|   | Evaluation results |  |  |  |  |
| Luminance between lamps ($cd/m^2$) | 4230 | 4320 | 4360 | 4670 | 4340 |
| Judgment | X | X | O | O | X |
| Thermal stability | O | O | X | O | O |
| Flame retardance | V-2 | V-2 | V-2 | nr | V-2 |
| Judgment | O | O | O |   | O |

TABLE 4

|  | Examples | | Comp. Ex. |
| --- | --- | --- | --- |
|  | 6 | 7 | 5 |
| PC (parts) | 100 | 100 | 100 |
| PCL (parts) | 0.3 | 0.5 | 3.0 |
| LD-1 (parts) | 0.5 | 0.5 | 0.5 |
| LD-2 (parts) | — | — | — |
| PP-1 (parts) | 0.2 | 0.2 | 0.2 |
| Si flame retarding agent (parts) | 0.3 | 0.3 | 0.3 |
| Evaluation results | | | |
| Luminance between lamps (cd/m$^2$) | 4640 | 4670 | 4700 |
| Judgment | ○ | ○ | ○ |
| Thermal stability | ○ | ○ | X |
| Flame retardance | V-2 | V-2 | NR |
| Judgment | ○ | ○ | |

As indicated by the data in Table 2, sufficient performance was observed in all categories when the constitution of this invention was satisfied (Examples 1-5). In addition, as shown by Examples 6 and 7 in Table 4, an improvement in luminance between lamps was observed when a specified amount of polycaprolactone was also added.

Similarly, as shown by the data in Table 3, some defects were observed in all cases when the constitution of this invention was not satisfied.

Comparative Examples 1 and 2 were cases in which the amount of a light diffusion agent that was added was greater than or less than the amount specified. The thermal stability and flame retardance passed for both cases, but the luminance between lamps was poor. Comparative Example 3 was a case in which the amount of a light storing agent that was added was greater than the amount specified. The luminance and flame retardance passed, but thermal stability was poor. Comparative Example 4 was a case in which the amount of the Si flame retarding agent that was added was less than the amount specified. The luminance between lamps and thermal stability passed, but flame retardance was poor.

Comparative Example 5 was a case in which the amount of the Si flame retarding agent added was greater than the amount specified. The thermal stability and flame retardance passed, but the luminance between lamps was poor due to haze.

Comparative Example 6 was a case in which the amount of polycaprolactone added was greater than the amount specified. The flame retardance passed, and the luminance between lamps passed, but the thermal stability and flame retardance were poor.

What is claimed is:

1. A flame retardant and light diffusing polycarbonate resin composition comprising 100 parts by weight of a polycarbonate resin (A), 0.1 to 6 parts by weight of a light diffusing agent (B) with an average particle diameter of 1 to 10 μm, 0.03 to 1 part by weight of a light storing agent (C) with an average particle diameter of 1 to 20 μm and 0.01 to 1.5 parts by weight of a silicone compound (D), wherein the main chain of the silicone compound (D) is branched and contains organic functional groups, wherein the organic functional groups essentially include aromatic groups and the organic functional groups other than terminal groups may optionally include hydrocarbon groups other than aromatic groups.

2. The polycarbonate resin composition of claim 1, further comprising 0.1 to 1.2 parts by weight of a polycaprolactone (E).

3. The polycarbonate resin composition of claim 1, wherein the amount of the light diffusing agent (B) is 0.2 to 5 parts by weight.

4. The polycarbonate resin composition of claim 1, wherein the amount of the light storing agent (C) is 0.05 to 0.5 parts by weight.

5. The polycarbonate resin composition of claim 1, wherein the light storing agent (C) is a strontium aluminate compound.

6. The polycarbonate resin composition of claim 1, wherein the silicone compound (D) contains at least 20 mole % of units represented by a formula $RSiO_{1.5}$ (T units) and/or units represented by a formula $SiO_{2.0}$ (Q units) per entire siloxane unit ($R_{3-0}SiO_{2-0.5}$), wherein R represents an organic functional group.

7. The polycarbonate resin composition of claim 1, wherein the organic functional groups of the silicone compound (D) contains at least 20 mole % of aromatic groups.

8. The polycarbonate resin composition of claim 1, wherein the aromatic groups are phenyl groups, the hydrocarbon groups other than the aromatic groups are methyl groups, and the terminal groups are at least one selected from the group comprising methyl groups, phenyl groups, hydroxyl groups and alkoxy groups.

9. The polycarbonate resin composition of claim 1, wherein the amount of the silicone compound (D) is 0.05 to 0.5 part by weight per 100 parts by weight of the polycarbonate resin (A).

10. A light diffusing sheet prepared by molding the polycarbonate resin composition of claim 1.

11. A liquid crystal display comprising the light diffusing sheet of claim 10.

12. A liquid crystal display that includes direct backlighting, wherein the direct backlighting comprises the diffusing sheet of claim 10.

13. The polycarbonate resin composition of claim 1, wherein the amount of the light diffusing agent (B) is 0.2 to 5 parts by weight, and the amount of the light storing agent (C) is 0.05 to 0.5 parts by weight.

14. A light diffusing sheet prepared by molding the polycarbonate resin composition of claim 13.

15. The polycarbonate resin composition of claim 13, further comprising 0.1 to 1.2 parts by weight of a polycaprolactone (E).

16. A light diffusing sheet prepared by molding the polycarbonate resin composition of claim 15.

17. The polycarbonate resin composition of claim 13, wherein the amount of the silicone compound (D) is 0.05 to 0.5 parts by weight per 100 parts by weight of the polycarbonate resin (A).

18. A light diffusing sheet prepared by molding the polycarbonate resin composition of claim 17.

19. The polycarbonate resin composition of claim 17, further comprising 0.1 to 1.2 parts by weight of a polycaprolactone (E).

20. A light diffusing sheet prepared by molding the polycarbonate resin composition of claim 19.

* * * * *